United States Patent [19]

Caplin

[11] Patent Number: 4,962,968
[45] Date of Patent: Oct. 16, 1990

[54] SKATEBOARD HUBCAP RETROFIT ASSEMBLY

[76] Inventor: Neil Caplin, 4215 Citrus Cir., Yorba Linda, Calif. 92686

[21] Appl. No.: 361,289

[22] Filed: Jun. 5, 1989

[51] Int. Cl.$^5$ .............................................. B60B 7/06
[52] U.S. Cl. ............................ 301/108 SC; 301/5.3; 301/37 S
[58] Field of Search ............ 301/5.3, 5.7, 37 R, 301/37 P, 37 CM, 37 PB, 37 TP, 37 S, 108 R, 108 A, 108 S

[56] References Cited

U.S. PATENT DOCUMENTS

| | | | |
|---|---|---|---|
| 2,241,686 | 5/1941 | Ware | 301/108 A |
| 3,079,202 | 2/1963 | Evans | 301/108 SC |
| 4,408,803 | 10/1983 | Green et al. | 301/5.7 |
| 4,511,182 | 4/1985 | Birnbaum | 301/5.7 X |
| 4,842,339 | 6/1989 | Roulinson | 301/108 S X |

*Primary Examiner*—Russell D. Stormer
*Attorney, Agent, or Firm*—Stetina and Brunda

[57] ABSTRACT

A skateboard hubcap for protecting the wheel bearings of a skateboard from environmental contamination, such as dirt, sand, and water. The invention also enhances the general appearance of the skateboard by concealing the axle nut and bearings. The skateboard hubcap comprises a shield which covers the normally exposed wheel bearings, an axle receiving column which slides over the axle nut, and detents on the inner flat surfaces of the substantially cylindrical extension to secure the skateboard hubcap on place. A spacer is placed behind the axle nut to assure adequate clearance for the detents to lock onto the axle nut.

4 Claims, 1 Drawing Sheet

4,962,968

SKATEBOARD HUBCAP RETROFIT ASSEMBLY

FIELD OF THE INVENTION

The present invention relates generally to hubcaps and more particularly to a skateboard hubcap retrofit assembly for protecting the wheel bearings of a skateboard from environmental contamination, such as dirt, sand, and water. The invention also enhances the general appearance of the skateboard by concealing the axle nut and bearings.

BACKGROUND OF THE INVENTION

Hubcaps are well known which both protect various parts of a wheel from contamination and enhance the general appearance of the vehicle upon which they are mounted. These hubcaps come in a variety of designs and are mounted to their respective wheels by a variety of means.

Hubcaps are used on the majority of automobiles. Automobile hubcaps are primarily used for aesthetic reasons. They hide the lug nuts, lug bolts, and axle. They are generally decorative in nature and can greatly enhance an automobile's appearance. They also provide some protection from contamination to the lug nuts and bolts. This is helpful since contamination can cause corrosion which makes the lug nuts difficult to remove from the lug bolts. Road hazards, such as sticks and stones, can strike exposed lug bolts and deform their threads. Therefore, hubcaps provide an accepted means for protecting wheel parts. Automobile hubcaps are generally secured to the wheel with spring detents. Deformable spring detents on the hubcap engage corresponding non-deformable detents on the wheel. Automobile hubcaps are occasionally secured with screws or other attachment means.

The wheels of many other types of rolling equipment also use hubcaps. Hubcaps are common on lawn mowers, wheelbarrows, trailers, and carts. Hubcaps can even be found on childrens' toys, such as wagons and tricycles.

Skateboards are commonly used outdoors on sidewalks and roadways where they are subject to the same environmental contamination as other vehicles. Foreign objects, such as sand, dirt, and water, frequently contaminate the wheel bearings of skateboard wheels. This contamination results in excessive wear and an increased failure rate of the wheel bearings.

The axle nut and wheel bearing assembly of a skateboard is exposed and visible. This not only increases the likelihood of damage to these items, but also is aesthetically displeasing. This is in contrast to the rest of the skateboard which may contain artistic designs and bright colors to enhance its appearance.

No hubcap is currently known to exist in the art for attachment to the wheels of a skateboard.

As such, although the problems solved through the use of hubcaps are well known, no proposed solution has to date addressed the use of hubcaps on skateboard wheels.

SUMMARY OF THE INVENTION

The present invention specifically addresses and alleviates the above-mentioned deficiencies. More particularly, the present invention comprises an apparatus for protecting the wheel bearings of a skateboard from environmental contamination, such as dirt, sand, and water. The invention also enhances the general appearance of the skateboard by concealing the axle nut and wheel bearings. A generally flat, round shield provides an ideal surface of the mounting of decorative stickers to further enhance the appearance of the skateboard. The skateboard hubcap has a hexagonal axle receiving column formed on one side of the shield which slides over the axle nut. Detents on the inner flat surfaces of the substantially cylindrical extension secure the skateboard hubcap in place by extending inward toward the axle, thereby locking the axle receiving column onto the axle nut. A spacer is placed behind the axle nut to assure that the skateboard hubcap's axle receiving column can slide far enough onto the axle nut for the detents to look into place behind the axle nut.

The advantages of the skateboard hubcap retrofit assembly will be more apparent from the following description and drawings. It is understood that changes in the specific structure shown and described may be made within the scope of the claims without departing from the spirit of the invention.

DETAILED DESCRIPTION OF THE PRESENTLY PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
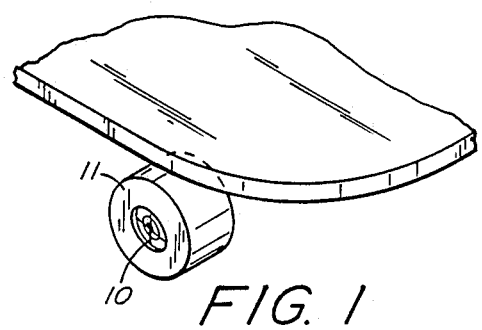
FIG. 1 is a perspective view of a skateboard wheel having a skateboard hubcap of the present invention mounted thereon.

Referring to FIG. 1, a skateboard hubcap 10 of the present invention is installed on a skateboard wheel 11.

Figure 2:
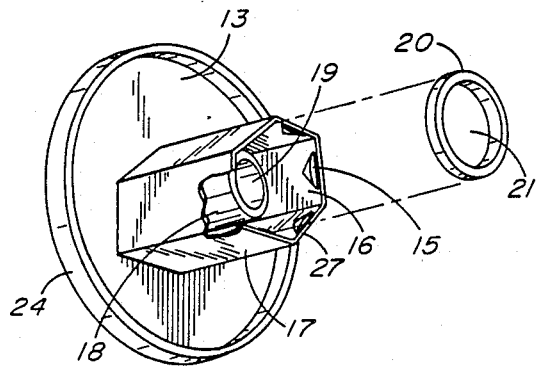
FIG. 2 is a perspective view of the skateboard hubcap and spacer.

Referring to FIG. 2, the skateboard hubcap has a shield 24 sized to cover the normally exposed bearings of a skateboard wheel. Formed on the inner surface 13 of the shield 24 is an axle receiving column 17 which extends from the inner surface of the shield 13. The axle receiving column 17 is hexagonal in cross-section shape. The axle receiving column 17 has inner flat surfaces 16 and a central opening 27. The central opening 27 is sized to fit the axle nut of a skateboard wheel. Detents 15 formed on the inner surfaces 16 of the axle receiving column 17 lock over the axle nut 23 to secure the skateboard hubcap onto the axle nut 23 of the skateboard wheel. A cylindrical stop 18 is formed within the opening 25 of the axle receiving column 17 and limits the axial movement of the shield 24 toward the axle nut 23. The opening 19 of the stop 18 is sized to receive and engage the skateboard axle 22, thereby better securing the skateboard hubcap 10 to the skateboard wheel 11. The diameter of the opening 19 of the stop 18 must be smaller than the outer diameter of the axle 22. In the preferred embodiment a diameter of 0.3 inch for the opening 19 is used since this provides a secure fit with conventional skateboard axles. The skateboard hubcap is preferably made of an injection-molded plastic. Alternatively, a metal, such as aluminum, could be used.

A spacer 20 is disposed intermediate the axle nut 23 and the inner race of the wheel bearing 26 to position the axle nut 23 off of the inner race of the bearing 26 of the skateboard Wheel 11 thereby providing a relief region so that the detents 15 of the axle receiving column 17 may engage the inner surfaces 25 of the axle nut 23. The relief region is that area between the inner surface 25 of the axle nut 23 and the inner race of the bearing 26. This is the area occupied by the detent 15 when the skateboard hubcap 10 is installed on a skateboard wheel. If the spacer 20 is not used, then the axle nut 23 directly abuts the inner race of the bearing 26. The axle receiving column 17 cannot slide far enough onto the axle nut 28 for the detent 15 to engage the inner surface 25 of the axle nut 23, since no relief region is provided. The spacer 20 is preferably made of a metal, such as steel or aluminum.

Figure 3:
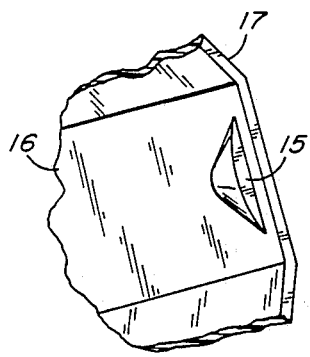
FIG. 3 is an enlarged cutaway perspective view of an inner flat surface of the axle receiving column showing a detent.
Figure 6:
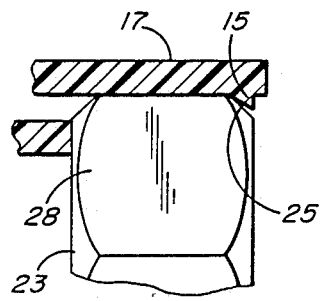
FIG. 6 is an enlarged perspective view showing a detent locked into the relief region behind an axle nut.
Figure 7:
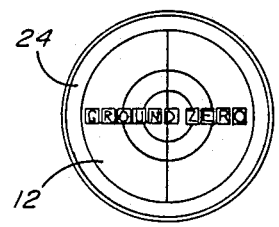
FIG. 7 is a front elevation view of the skateboard hubcap having a decorative sticker applied to it.

FIG. 3 shows an enlarged view of a detent 15 which is formed on the inner flat surface 16 of the axle receiving column 17. It is this detent 15 which snaps into place in the relief region behind the axle nut thereby securing the skateboard hubcap to the axle nut. This is best seen in FIG. 6. FIG. 6 shows the detent 15 in place behind the axle nut 23 and adjacent the inner surface 25 of the axle nut 23. The inner flat surfaces 16 of the axle receiving column 17 surround the flat sides of the axle nut 28.

Figure 4:
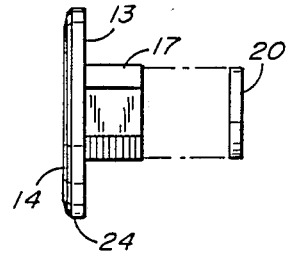
FIG. 4 is a side elevation view of the skateboard hubcap and spacer.

As shown in FIG. 4, the shield 24 has an outer surface 14 which is substantially flat and receptive to the application of decorative stickers. The spacer 20 has an opening 21, best shown in FIG. 2, sized so that it will fit over the axle of a skateboard wheel. The outer diameter of the spacer 20 is slightly less than the inner diameter of the axle receiving column 17. That is, the spacer 20 is sized to fit within the opening 27 in the axle receiving column 17.

Figure 5:
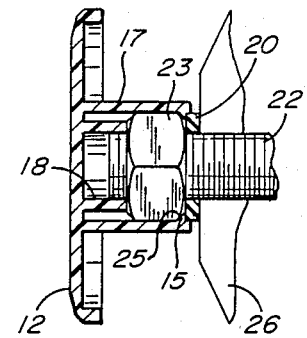
FIG. 5 is a cutaway side plan view of the skateboard hubcap and spacer as they are installed on a skateboard wheel.

FIG. 5 shows the skateboard hubcap 10 installed on a skateboard's axle nut 23. The detents 15 of the axle receiving column 17 are locked into place in the relief region behind the axle nut 23. The spacer 20 positions the axle nut 23 away from the inner race of the bearing 26 to provide a relief region so that the detents 15 of the axle receiving column 17 may lock into place behind the inner surface 25 of the axle nut 23.

The stop 18 abuts against the axle nut 23 and limits the axial travel of the axle nut within the axle receiving column 17. The stop 18 also engages the axle 22 further securing the skateboard hubcap 12 to the skateboard wheel.

To mount the skateboard hubcap onto the wheel of a skateboard, the axle nut 23 is first removed from the axle 22. Next the spacer 20 is placed onto the axle. The axle nut 23 is then replaced. Next the axle receiving column 17 of the skateboard hubcap 10 is slid over the axle nut until the detents 15 on the inner surface 16 of the axle receiving column 17 snap into place in the relief region behind the axle nut 23. Decorative stickers 12 may be placed upon the outer flat surface of the shield.

What is claimed is:

1. A skateboard assembly for covering a normally exposed axle nut and wheel bearings of a skateboard wheel comprising:
    (a) a shield sized to cover the exposed skateboard axle nut and wheel bearings;
    (b) an axle receiving column, said axle receiving column being hexagonal in cross-sectional shape and connected to a first side of said shield and extending therefrom, said column having a central cavity, the inner surface of said cavity being formed for mating engagement about the axle nut;
    (c) a cylindrical strip connected to the first side of said first shield and extending therefrom, said cylindrical stop being affected to limit the axial movement of said shield toward the axle nut;
    (d) at least one dentent formed on said cavity inner surface for locking said axle receiving column in place about the axle nut to limit the axial movement of said shield away from the axle nut; and
    (e) a spacer disposed intermediate the axle nut and the wheel bearings, said spacer having an outer diameter less than that of the axle nut, for providing a relief region for receiving said dentent.

2. A skateboard hubcap assembly as recited in claim 1 wherein said stop is positioned and sized to receive and engage the skateboard axle.

3. A skateboard hubcap assembly as recited in claim 1 wherein said stop has an inner diameter that is less than the outer diameter of the axle.

4. A skateboard hubcap assembly as recited in claim 1 wherein said inner diameter of said strip measures approximately 0.3 inch.

* * * * *

UNITED STATES PATENT AND TRADEMARK OFFICE
CERTIFICATE OF CORRECTION

PATENT NO. : 4,962,968

DATED : October 16, 1990

INVENTOR(S) : Neil Caplin

It is certified that error appears in the above-identified patent and that said Letters Patent is hereby corrected as shown below:

In the abstract, at line 10, please delete the word "on" and insert therefore, --in--.

At Column 2, line 12, please delete the word "look" and insert therefore, --lock--.

At Column 3, line 20, please delete the word "Wheel" and insert therefore, --wheel--.

At Column 4, line 33, please delete the word "strip" and insert therefore, --stop--.

At Column 4, line 52, please delete the word "strip" and insert therefore, --stop--.

Signed and Sealed this

Twelfth Day of May, 1992

Attest:

DOUGLAS B. COMER

*Attesting Officer*         *Acting Commissioner of Patents and Trademarks*